Figure 1:
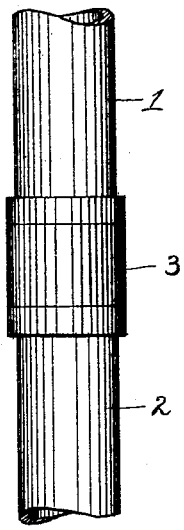

No. 745,842. PATENTED DEC. 1, 1903.
J. A. & H. W. HOCK.
DRIVE PIPE.
APPLICATION FILED MAR. 4, 1903.
NO MODEL.

Witnesses.
Inventors.
John A Hock &
Henry W Hock
By Kay & Totten
Attorneys.

No. 745,842. Patented December 1, 1903.

UNITED STATES PATENT OFFICE.

JOHN A. HOCK AND HENRY W. HOCK, OF YOUNGSTOWN, OHIO, ASSIGNORS TO NATIONAL TUBE COMPANY, OF PITTSBURG, PENNSYLVANIA, A CORPORATION OF NEW JERSEY.

DRIVE-PIPE.

SPECIFICATION forming part of Letters Patent No. 745,842, dated December 1, 1903.

Application filed March 4, 1903. Serial No. 146,131. (No model.)

*To all whom it may concern:*

Be it known that we, JOHN A. HOCK and HENRY W. HOCK, residents of Youngstown, in the county of Mahoning and State of Ohio, have invented a new and useful Improvement in Drive-Pipe; and we do hereby declare the following to be a full, clear, and exact description thereof.

Our invention relates to drive and like pipe—that is, to the pipe used in making drive-wells, laying pipe-lines, &c. The pipe usually employed for this purpose has been of the ordinary type of wrought-metal pipe of suitable strength of body connected by the ordinary threaded joint, the sockets in some cases having recesses at the outer edges to receive the body of the pipe. This pipe is subjected to heavy blows from a drop-weight, as in driving piles, and in this way very considerable strain is brought upon the body of the pipe and upon the joint, and as this longitudinal shock must be transmitted through the joints where the pipe has been threaded to form the joint they are of course the weakest part, and three sources of difficulty are liable to occur—first, the thread itself is liable to strip under the blows, spoiling the joint; second, the body of the pipe at a point a short distance above the socket is liable to bulge outward under the blows of the drop-weight, and this tends to cause the pipe at a point near the end of the socket to bend inward, which causes the thread of the pipe to leave the thread of the socket, leading to leakage and in some cases causing deflection of the pipe from the straight line through the slipping or stripping of the joint on one side, which gives the well-driller trouble and in many cases makes it necessary to withdraw the pipe from the well, in which case it is cast aside as defective, and quite often the hole itself has to be abandoned at a large expense to the operator and owner; third, the drive-pipe itself will break under the severe shocks in driving, in which case the main point of weakness is found to be where the thread ends on the pipe, which cannot well be covered by the socket, and even if covered by the recess of the socket there is not a sufficiently tight connection between such wall of the recess and the wall of the pipe to overcome the weakening through such threading. Similar difficulties have been found in connection with line-pipe, where peculiar lateral strains are brought upon the same on account of vertical or lateral curves in the laying of the line, which strain has been liable to loosen the joints, these being the weakest parts of the line.

The object of our invention is to overcome these difficulties in this particular class of pipe and to strengthen the body of the pipe at the joint and relieve the threads of the pipe and socket from the great longitudinal strain.

To these ends the invention consists in the combination of a pipe-section having a threaded end portion and beyond and close to the same an encircling band rigidly secured thereto and extending radially beyond the threaded portion and a pipe-coupling engaging with the threaded portion, such encircling band reinforcing and supporting the pipe against the bulging action above referred to and holding the body of the pipe straight and, if desired, the band contacting with the body of the socket and carrying the longitudinal strain of the blows of the drive-weight through the socket and relieving the threads therefrom.

To enable others skilled in the art to make and use our invention, we will describe the same more fully, referring to the accompanying drawings, in which—

Figure 2:
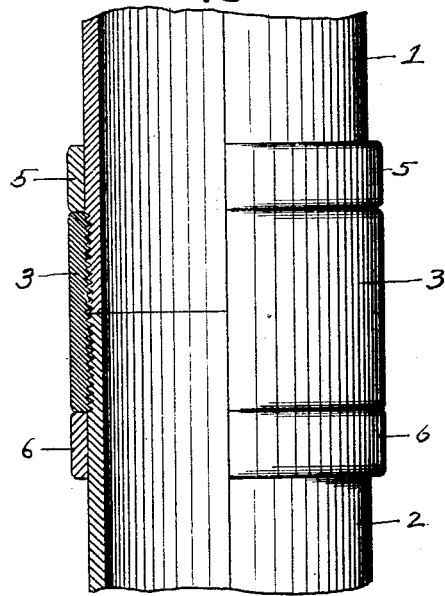
Figure 3:
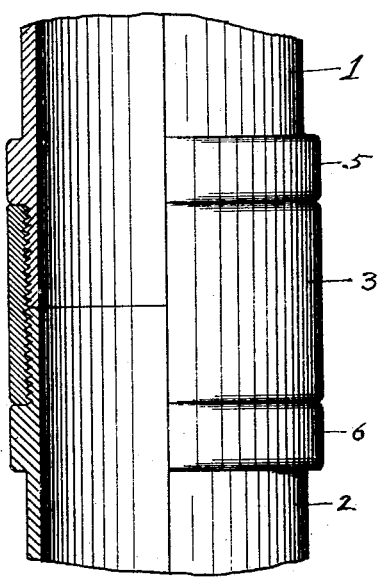

Figure 1 is a side view of a drive-pipe having the invention applied thereto. Fig. 2 is a cross-section of the same, illustrating the invention in connection with a threaded joint; and Fig. 3 is a like sectional view showing the bands secured to the pipe in another way.

The drive-pipes 1 and 2 may be connected by any suitable coupling-socket 3, the joint illustrated between the coupling-socket and the drive-pipe being the usual threaded joint, the socket having the recess 4 at the end to receive the upper or vanishing portion of the threads. Encircling and rigidly secured to the drive-pipe beyond but close to such coupling-socket are the reinforcing-bands 5 and 6, which, as illustrated, are made of about the same outer diameter as of the coupling-socket and in their preferred use are adapted when the joint is formed to contact with the top and bottom of the socket, so as to transmit through the body of the socket the longitudinal jars or strains of driving the pipe into the ground. These bands are usually made of the same material as the pipe (wrought iron or steel) and are usually made of sufficient height and thickness for the purpose intended, being shown as about one-third the height or length of the coupling-body. They may be secured to the body of the pipe in any suitable way, and the means employed for securing the bands in position will of course depend upon the size and character of the pipe and strain to which it is subjected. For most uses the most desirable way of securing the bands in position is by shrinking them upon the pipe, the bands being heated and when so heated slipped over the body of the pipe to the proper position thereon and in shrinking upon the same forming a rigid joint therewith sufficient to sustain practically all strains. Such construction is shown in Fig. 2. For very heavy pipe or where the same is subjected to the greatest strain, such as in driving through hard substances, these pipes being in some cases used where a hundred or more blows are required to advance the same as much as an inch, it may be desirable to weld the reinforcing-bands to the pipe, and for that purpose both the pipe and the bands may be raised to a welding heat and the bands slipped around the pipe and firmly welded thereto before the threading of the ends of the pipe. The bands may also be secured by wedging or other means. It is desirable for some kind of drive-pipe that the bands shall come into actual contact with the socket-body, as illustrated in the drawings, so as to transmit the shock from one drive-pipe to the other through the body of the coupling without subjecting the threads or other coupling device to the severe strains or blows or to some extent to relieve the same of such strain. For ordinary purposes the bands may be located and secured in place without the necessity of turning the faces of such bands; but, if desired, the bands may be secured to the drive-pipe before threading and as part of the threading operation the faces of the bands be turned to insure an accurate and proper contact with the edge of the coupling.

In the use of the invention the drive-pipe are screwed or otherwise secured within the coupling-socket and by preference the inner faces of the bands brought into contact with the ends of the coupling-socket, as above set forth, and the pipe are driven in the ordinary way. When so used, as the bands encircle the pipe at about the point where the pipe are liable to bulge, as above described, and as the bands reinforce the solid or threaded walls of the pipe at about this point they sustain the pipe against such outward bulging action and in so doing prevent the inward bulging of the threaded portions of the pipe within the joint, and thereby overcome the tendency to stripping of the joint and the leakage or deflection of the pipe in driving, as above described. Where the bands contact with the coupling-socket, the jars in driving are transmitted through the reinforcing-bands of the upper pipe to the socket and from that socket to the reinforcing-bands of the lower pipe, so relieving the threaded or other joint connection between the pipes from practically all this strain and preventing stripping of the threads or disengaging of the coupling devices. Practically the same advantages are found in connection with line-pipe and other pipe used in like positions, as the bands will strengthen the pipe at the joints and prevent collapse of the same under the lateral strains, and where the bands contact with the coupling they will impart such strength to the same as against such lateral strains as will prevent undue deflection of the line at the joints as compared with the body of the pipe.

What we claim is—

1. In drive or like pipe, the combination of a pipe-section having a threaded end portion and beyond and close to the same an encircling band rigidly secured thereto and extending radially beyond the threaded portion, and a pipe-coupling engaging with said threaded portion.

2. In drive or like pipe, the combination of a pipe-section having a threaded end portion and beyond and close to the same an encircling band rigidly secured thereto and extending beyond the threaded portion, and a pipe-coupling engaging with the threaded portion, the reinforcing-band being adapted to engage with the end of the socket when the joint is formed.

3. In drive or like pipe, the combination of a pipe-section having a threaded end portion and beyond and close to the same an encircling band welded to the pipe-body and extending radially beyond the same, and a pipe-coupling engaging with the threaded portion.

In testimony whereof we, the said JOHN A. HOCK and HENRY W. HOCK, have hereunto set our hands.

JOHN A. HOCK.
        HENRY W. HOCK.

Witnesses:
  JOHN M. ROSIE,
  W. D. VAN HORN.